United States Patent [19]

Hisgen et al.

[11] Patent Number: 4,762,906
[45] Date of Patent: Aug. 9, 1988

[54] WHOLLY AROMATIC MESOMORPHIC POLYETHER ESTER IMIDE AND THE PREPARATION THEREOF

[75] Inventors: Bernd Hisgen, Limburgerhof; Michael Portugall, Wachenheim; Gerd Blinne, Bobenheim, all of Fed. Rep. of Germany

[73] Assignee: BASF Aktiengesellschaft, Fed. Rep. of Germany

[21] Appl. No.: 938,237

[22] Filed: Dec. 4, 1986

[30] Foreign Application Priority Data

Dec. 4, 1985 [DE] Fed. Rep. of Germany ....... 3542833

[51] Int. Cl.$^4$ ............................................. C08G 73/16
[52] U.S. Cl. ................................... 528/170; 528/125; 528/128; 528/173; 528/176; 528/190; 528/193; 528/194; 528/289
[58] Field of Search ............... 528/170, 125, 128, 173, 528/176, 190, 193, 194

[56] References Cited

U.S. PATENT DOCUMENTS

| | | | |
|---|---|---|---|
| 4,118,372 | 10/1978 | Schaefgen | 528/190 |
| 4,176,223 | 11/1979 | Irwin | 528/170 |
| 4,206,261 | 6/1980 | Laganis et al. | 528/170 |
| 4,375,530 | 3/1983 | Hay et al. | 524/605 |
| 4,383,105 | 5/1983 | Irwin | 528/170 |
| 4,564,669 | 1/1986 | Dicke et al. | 528/173 |

FOREIGN PATENT DOCUMENTS 0163518 12/1985 European Pat. Off. .

OTHER PUBLICATIONS

Journal Polymer Science, (A-1), vol. 7,321,332 1969, K. H. Illers: Mekromol Chemie 1969 (unavailable in the English version).
A. I. Koltsov et al., *J. Polymer Sci.: Symposium*, No. 42, pp. 867-877 (1973).

Primary Examiner—Harold D. Anderson
Attorney, Agent, or Firm—Keil & Weinkauf

[57] ABSTRACT

Wholly aromatic mesomorphic polyether ester imides which form a liquid-crystalline fiber-forming melt below 320° C. and are composed of
(a) from 5 to 35 mol % of repeat units of the formula I

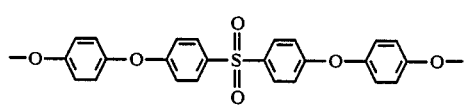 (I)

(b) from 5 to 35 mol % of repeat units of the formula II

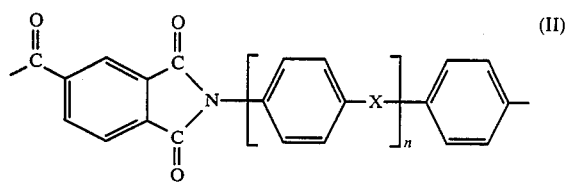 (II)

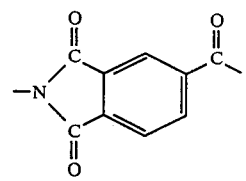

where X is a chemical bond, —O—, —S—, —SO$_2$—, —CO—, —Ch$_2$— or =C(CH$_3$)$_2$, and n is 0 or 1,
(c) from 15 to 30 mol % of repeat units of the formula III

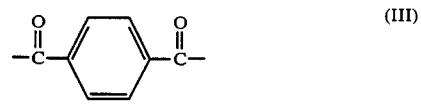 (III)

(d) a molar amount corresponding to the total amount of (b) plus (c) minus (a) of repeat units of the formulae IV and/or V

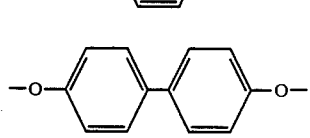 (IV)

(V)

(e) repeat units of the formula VI

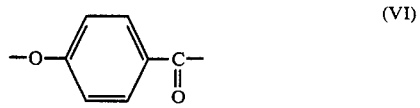 (VI)

the mole percentages of components a, b, c, d and e adding up to a 100 mol % in each case,
the preparation thereof and fibers, films and molding prepared therefrom.

9 Claims, No Drawings

WHOLLY AROMATIC MESOMORPHIC POLYETHER ESTER IMIDE AND THE PREPARATION THEREOF

The present invention relates to wholly aromatic polyether ester imides which form a liquid-crystalline fiber-forming melt below 320° C.

U.S. Pat. No. 4,383,105 discloses polyester imides which are based on hydroxynaphthalenecarboxylic acid, 4-hydroxybenzoic acid and 4-carboxy-N-(p-hydroxyphenyl)phthalimide. However, these polyester imides require processing temperatures of above 320° C., as do the polyester imides disclosed in U.S. Pat. No. 4,176,223, which are derived from 4-(4-hydroxyphthalimido)phenol, terephthalic acid and naphthalenedicarboxylic acid as well as substituted or unsubstituted hydroquinones. In addition, disubstituted naphthalene components are not exactly inexpensive starting materials.

It is an object of the present invention to provide wholly aromatic mesomorphic polyether ester imides which are processable from the melt below 320° C. and have a high heat distortion resistance and a smooth abrasion-resistant surface.

We have found that this object is achieved with wholly aromatic mesomorphic polyether ester imides which form a liquid-crystalline fiber-forming melt below 320° C. and are composed of (a) from 5 to 35 mol% of repeat units of the formula I (I)

(b) from 5 to 35 mol% of repeat units of the formula II (II)

where X is a chemical bond, —O—, —S—, —SO$_2$—, —CO—, —CH$_2$— or =C(CH$_3$)$_2$, and n is 0 or 1, (c) from 15 to 30 mol% of repeat units of the formula III (III)

(d) a molar amount corresponding to the total amount of (b) plus (c) minus (a) of repeat units of the formulae IV and/or V

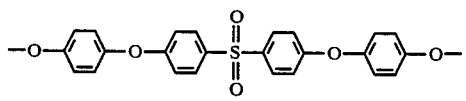

(IV)

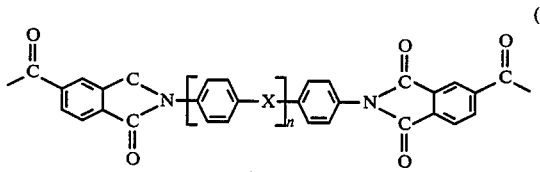

(V)

(e) from 0 to 50 mol% of repeat units of the formula VI (VI)

the mole percentages of (a), (b), (c), (d) and (e) adding up to 100 mol% in each case.

The novel wholly aromatic liquid-crystalline polyester ester imides can be processed from the melt below 320° C. and have a high heat distortion resistance. The novel polyether ester imides also have a smooth abrasion-resistance surface, high stiffness, strength and resilience and, finally, the advantage of being substantially resistant to chemicals and of low flammability.

The liquid-crystalline state of the polyether ester imides can be detected with a polarization microscope by a method described in German Published Application DAS No. 2,520,819. Applied in a thickness of 10 μm between glass plates and viewed between crossed polarizers, the polymer melts have textures which can be ascribed to a mesomorphic (nematic) phase.

The polyether ester imides according to the invention are composed of (a) from 5 to 35 mol% of repeat units of the formula I (I)

a suitable starting compound being, for example, 4,4'-di(p-hydroxyphenoxy)diphenyl sulfone, (b) from 5 to 35 mol% of repeat units of the formula II (II)

where X is a chemical bond, —O—, —S—, —SO$_2$—, —CO—, —CH$_2$— or =C(CH$_3$)$_2$, and n is 1 or 0, suitable starting compounds being, for example, 4,4'-bis[(4-carboxy)-N-phthalimido]diphenyl ether, 4,4'-bis[(4-carboxy)-N-phthalimido]diphenylmethane, 4,4'-bis[(4-carboxy)-N-phthalimido]diphenyl sulfone, 4,4'-bis[(4-carboxy)-N-phthalimido]diphenyl sulfide, 4,4'-bis[(4-carboxy)-N-phthalimido]diphenyl ketone,
3,4'-bis[(4-carboxy)-N-phthalimido]diphenyl ether,
3,4'-bis[(4-carboxy)-N-phthalimido]diphenyl sulfide,
3,4'-bis[(4-carboxy)-N-phthalimido]diphenyl sulfone,
3,4'-bis[(4-carboxy)-N-phthalimido]diphenyl ketone,
3,4'-bis[(4-carboxy)-N-phthalimido]diphenylmethane.
(The preparation of these starting compounds is described, for example, in J. Polym. Sci. (A-1), 7 (1969), 321–332),
(c) from 15 to 30 mol% of repeat units of the formula III

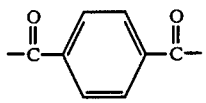
(III)

a suitable starting compound being, for example, terephthalic acid,
(d) a molar amount corresponding to the total amount of components (a) and (b) minus (c) of repeat units of the formulae IV and/or V

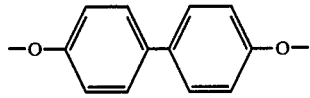
(IV)

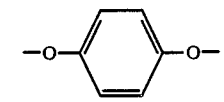
(V)

starting compounds being, for example, hydroquinone and 4,4'-dihydroxybiphenyl,
(e) repeat units of the formula VI

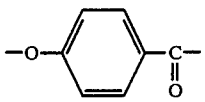
(VI)

a starting compound being, for example, 4-hydroxybenzoic acid.

It will be readily understood that the mole percentages of components (a), (b), (c), (d) and (e) add up to 100 mol% in each case.

Preferred polyether ester imides are composed of
(a) from 10 to 30 mol% of repeat units of the formula I,
(b) from 10 to 30 mol% of repeat units of the formula II,
(c) from 15 to 30 mol% of repeat units of the formula III,
(d) a molar amount corresponding to the total amount of (b) plus (c) minus (a) of repeat units of the formulae IV and/or V and
(e) repeat units of the formula VI.

Particularly suitable polyether ester imides are composed of
(a) from 15 to 25 mol% of repeat units of the formula I,
(b) from 15 to 25 mol% of repeat units of the formula II,
(c) from 20 to 30 mol% of repeat units of the formula III,
(d) a molar amount corresponding to the total amount of (b) plus (c) minus (a) of repeat units of the formulae IV and/or V, in particular IV, and
(e) repeat units of the formula VI.

Preferred polyether ester imides contain repeat units of the formula VI in an amount of not less than 10 mol%.

Preferred wholly aromatic polyether ester imides have a glass transition temperature of $>150°$ C., in particular $\geq 170°$ C. The glass transition temperature is measured by the DSC method described by K. H. Illers et al. in Makromol. Chem. 127 (1969), 1, The wholly aromatic liquid-crystalline polyether ester imides form a liquid-crystalline fiber-forming melt at $<320°$ C. Preference is also given to liquid-crystalline aromatic polyether ester imides which have partial crystallinity at $>200°$ C. and $<300°$ C.

The liquid-crystalline polyether ester imides according to the invention are obtainable by reacting the hydroxy and carboxy compounds corresponding to units I, II, III and IV and the ester-forming derivatives thereof in a manner similar to that described for example in U.S. Pat. Nos. 4,375,530 and 4,118,372.

In an advantageous embodiment, the polyether ester imides according to the invention are obtained in a single-stage process by converting the underivatized starting materials using anhydrides of lower fatty acids, for example fatty acids of 2 to 4 carbon atoms, in particular acetic anhydride, with or without catalysts. Suitable catalysts are described for example in EP-A-No. 131,846 (page 9). They are advantageously used in an amount of from 0.001 to 1% by weight, based on starting materials. In the reaction, the starting materials are heated together with the fatty acid anhydride, which is advantageously present in a molar excess of not less than 5%, based on the hydroxyl groups present, with stirring in an inert gas atmosphere to a temperature at which reflux occurs. Advantageously the temperature is increased in stages, for example to 130°–200° C. in not more than 5 hours, preferably up to 2 hours, and then to 250°–350° C., for example in the course of 2–2½ hours, while excess fatty acid anhydrides and fatty acids are distilled off. To complete the reaction, it has been found to be advantageous to employ reduced pressure, for example 200–0.1 mbar, toward the end.

It is a remarkable and unforeseeable feature of this single-stage process that the desired polymers are obtained in a relatively short time in a trouble-free and complete reaction without catalysts. This is all the more remarkable as the large number of chemically different hydroxyl groups would be expected to lead to differences in reactivity and hence to inadequate polymer synthesis.

The wholly aromatic liquid-crystalline polyether ester imides thus obtained are advantageously further condensed in the solid state, for example at 150°–250° C., until the desired viscosity is obtained. This postcondensation in solid phase can take place not only before but also after thermoplastic processing. Advantageously the condensation in solid phase is carried out in the presence of inert gases such as nitrogen.

The polyether ester imides according to the invention can be modified by means of conventional additives such as stabilizers, oxidation inhibitors, agents against thermal decomposition and decomposition by ultraviolet light, lubricants, mold release agents, colorants such as dyes and pigments, fibrous or pulverulent fillers and reinforcing agents, nucleating agents or plasticizers. These agents are used in conventional active amounts.

The stabilizers can be added to the polyether ester imides at any stage of the preparation or when completed. Preferably the stabilizers are added early on to prevent the onset of decomposition before the polymers are protected.

The oxidation inhibitors and heat stabilizers which can be added to the polyether ester imides according to the invention include those which are generally employed for polymers, such as halides of metals of group I of the periodic table, for example halides of sodium, potassium or lithium with copper(I) halides, for example chlorides, bromides or iodides. Further suitable stabilizers are sterically hindered phenols, hydroquinones and various substituted representatives of these groups and combinations thereof. These stabilizers are generally employed in concentrations of up to 1% by weight, based on the weight of the mixture.

Suitable UV stabilizers also include those which are generally added to polymers, for example in amounts of up to 2% by weight, based on the polymeric material. Examples of UV stabilizers are various substituted resorcinols, salicylates, benzotriazoles, benzophenones and the like.

Further assistants are organic dyes such as nigrosine and also pigments such as titanium dioxide, cadmium sulfide, cadmium sulfide selenide, phthalocyanines, ultramarine blue or carbon black. Suitable fibrous and pulverulent fillers and reinforcing agents are carbon fibers, glass fibers, amorphous silica, asbestos, calcium silicate, aluminum silicate, magnesium carbonate, kaolin, chalk, quartz powder, mica or feldspar. These reinforcing agents are used in amounts of up to 70% by weight of the polymer.

Suitable assistants also include nucleating agents, such as talcum, calcium fluoride, sodium phenylphosphinate, aluminum oxide and finely divided polytetrafluoethylene.

Suitable plasticizers which can be employed in amounts of up to 20% by weight of polymer are dioctyl phthalate, dibenzyl phthalate, butyl benzyl phthalate, hydrocarbon oils, N-n-butylbenzenesulfonamide and o- and p-tolueneethylsulfonamide. Colorants such as dyes or pigments can be used in amounts of up to 5% by weight.

The wholly aromatic liquid-crystalline polyether ester amides according to the invention are suitable for preparing filaments, films, foams and industrial moldings by injection molding, pressing or extruding. The moldings prepared from the polyether ester imides according to the invention have excellent mechanical properties such as stiffness, strength and resilience. They are remarkably resistant to chemicals and flame-retardant. They also have a high heat distortion resistance and a smooth abrasion-resistant surface. The polyether ester imides according to the invention are therefore highly suitable for preparing moldings for electrical engineering, data processing, automotive construction and other industrial sectors. But they can also be used as surface coating materials, in pulverulent dispersion or as film.

The invention is illustrated by the following Examples.

EXAMPLE 1

0.09 mol of terephthalic acid, 0.09 mol of hydroquinone, 0.09 mol of the compound

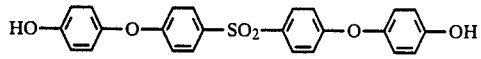

0.09 mol of the compound

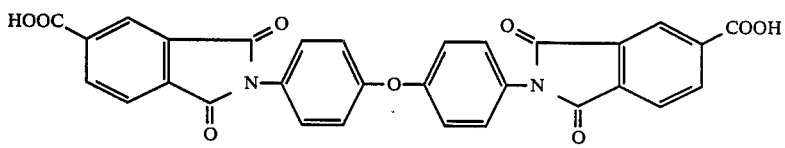

and 100 ml of acetic anhydride are heated with stirring under nitrogen from 150° C. to 300° C. in the course of 2 h 50 min, while excess acetic anhydride and acetic acid are distilled off. The pressure is then reduced to 85 mbar in the course of 15 min to give a viscous fiber-forming melt. The polymer melt and the cold polymer have a pearlescent luster. The polymer has a smooth, hard and abrasion-resistant surface. DSC measurements indicate a glass transition temperature of 178° C. and a melting point of 290° C. The intrinsic viscosity is 0.51 dl/g, measured at 60° C. in an 0.1% strength (wt./vol.) solution in pentafluorophenol.

EXAMPLE 2

0.08 mol of terephthalic acid, 0.08 mol of 4-hydroxybenzoic acid, 0.08 mol of hydroquinone, 0.08 mol of the compound

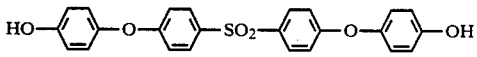

0.08 mol of the compound

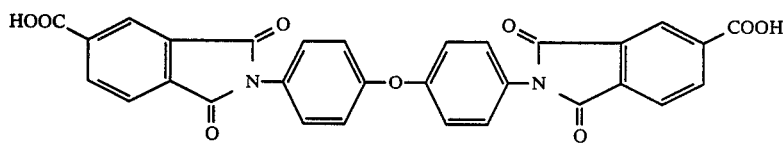

and 96 ml of acetic anhydride are heated with stirring under nitrogen from 150° C. to 300° C. in the course of 2 h 50 min, while excess acetic anhydride and acetic acid are distilled off. The pressure is then reduced to 110 mbar in the course of 20 min to give a viscous fiber-forming melt. The polymer melt and the cold polymer have a pearlescent luster. The polymer has a smooth, hard and abrasion-resistant surface. DSC measurements indicate a glass transition temperature of 176° C. The intrinsic viscosity is 0.64 dl/g, measured at 60° C. in an 0.5% strength (wt./vol.) solution in 4-chlorophenol.

We claim:

1. A wholly aromatic mesomorphic polyether ester imide which forms a liquid-crystalline fiber-forming melt below 320° C. and is composed of
(a) from 5 to 35 mol% of repeat units of the formula I

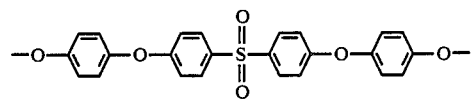 (I)

(b) from 5 to 35 mol% of repeat units of the formula II

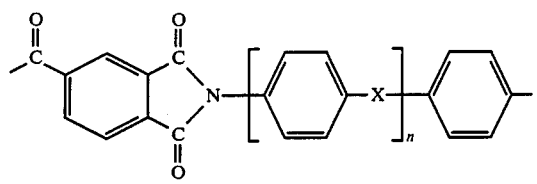 (II)

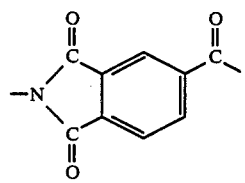

where X is a chemical bond or X is —O—, —S—, SO$_2$—, —CO—, —CH$_2$— or =C(CH$_3$)$_2$, and n is 0 or 1,
(c) from 15 to 30 mol% of repeat units of the formula III

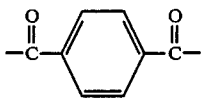 (III)

(d) a molar amount corresponding to the total amount of (b) plus (c) minus (a) of repeat units selected from the group consisting of formulae IV, V and mixtures thereof,

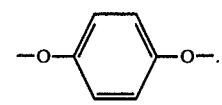 (IV)

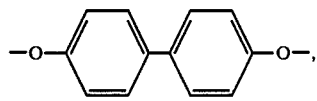 (V)

and
(e) repeat units of the formula VI

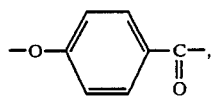 (VI)

and the mole percentages of components a, b, c, d and e adding up to 100 mol% in each case.

2. A wholly aromatic mesomorphic polyether ester imide as claimed in claim 1, composed of
(a) from 10 to 30 mol% of repeat units of the formula I,
(b) from 10 to 30 mol% of repeat units of the formula II,
(c) from 15 to 30 mol% of repeat units of the formula III,
(d) a molar amount corresponding to the total amount of (b) plus (c) minus (a) of repeat units selected from the group consisting of the formulae IV, V and mixtures thereof,
(e) repeat units of the formula VI, the mole percentages of components a, b, c, d and e adding up to 100 mol% in each case.

3. A wholly aromatic mesomorphic polyester ester imide as claimed in claim 1, composed of
(a) from 15 to 25 mol% of repeat units of the formula I,
(b) from 15 to 25 mol% of repeat units of the formula II,
(c) from 20 to 30 mol% of repeat units of the formula III,
(d) a molar amount corresponding to the total amount of (b) plus (c) minus (a) of repeat units selected from the group consisting of the formulae IV, V and mixtures thereof,
(e) repeat units of the formula VI, the mole percentages of components a, b, c, d and e adding up to 100 mol% in each case.

4. A wholly aromatic mesomorphic polyether ester imide as claimed in claim 1, which has a glass transition temperature Tg ≧ 150° C.

5. A process for preparing aromatic mesomorphic polyether ester imides as claimed in claim 1 by reacting the monomers forming the repeating units of formulae I to VI in a single stage in the form of the underivatized hydroxy and carboxy compounds in the molar ratios described in the presence of excess fatty acid anhydride at elevated temperatures and distilling fatty acid anhydride and fatty acid out of the reaction mixture.

6. A process as claimed in claim 5, wherein the wholly aromatic mesomorphic polyether ester imide is postcondensed in the solid phase at 150°-250° C.

7. A fiber from a polyether ester imide as claimed in claim 1.

8. A film from a polyether ester imide as claimed in claim 1.

9. A molding from a polyether ester imide as claimed in claim 1.

* * * * *